(12) United States Patent
Nakada

(10) Patent No.: US 11,459,236 B2
(45) Date of Patent: Oct. 4, 2022

(54) HYDROGEN SULFIDE PRODUCTION METHOD AND SULFUR RECOVERY METHOD

(71) Applicant: SUMITOMO CHEMICAL COMPANY, LIMITED, Chuo-ku (JP)

(72) Inventor: Yoshihiro Nakada, Niihama (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 0 days.

(21) Appl. No.: 16/956,867

(22) PCT Filed: Dec. 21, 2018

(86) PCT No.: PCT/JP2018/047144
§ 371 (c)(1),
(2) Date: Jun. 22, 2020

(87) PCT Pub. No.: WO2019/131474
PCT Pub. Date: Jul. 4, 2019

(65) Prior Publication Data
US 2021/0053828 A1 Feb. 25, 2021

(30) Foreign Application Priority Data
Dec. 25, 2017 (JP) .............. JP2017-247733

(51) Int. Cl.
*C01B 17/16* (2006.01)
*B01D 53/14* (2006.01)
(Continued)

(52) U.S. Cl.
CPC ............ *C01B 17/162* (2013.01); *B01D 29/39* (2013.01); *B01D 53/1493* (2013.01);
(Continued)

(58) Field of Classification Search
CPC ..... C01B 17/162; C01B 17/168; B01D 29/39; B01D 53/1493; B01D 53/48; B01D 53/78; B01D 2252/2021
(Continued)

(56) References Cited

U.S. PATENT DOCUMENTS 4,020,149 A * 4/1977 Bosniack ........... B01D 53/1493
423/575
2008/0175778 A1 7/2008 Moller et al.
(Continued)

FOREIGN PATENT DOCUMENTS

EP 2 803 299 A1 12/2014
JP 60-139315 A 7/1985
(Continued)

OTHER PUBLICATIONS

International Search Report dated Jan. 29, 2019 in PCT/JP2018/047144 filed Dec. 21, 2018, citing documents AA and AO-AS therein, 2 pages.
(Continued)

*Primary Examiner* — Anita Nassiri-Motlagh
(74) *Attorney, Agent, or Firm* — Oblon, McClelland, Maier & Neustadt, L.L.P.

(57) ABSTRACT

An object of the present invention is to provide a hydrogen sulfide production method enabling efficient recovery of sulfur. The production method is a method for producing hydrogen sulfide from sulfur and hydrogen comprising (1) a reaction step of reacting sulfur and hydrogen to obtain a crude hydrogen sulfide gas, (2) a purification step of purifying the crude hydrogen sulfide gas by bringing the crude hydrogen sulfide gas into contact with aliphatic lower alcohol in a packed tower to precipitate sulfur contained in the crude hydrogen sulfide gas, (3) a discharge step of discharging from inside the packed tower a suspension of sulfur in aliphatic lower alcohol obtained in the purification step, and (4) a filtration step of filtering the aliphatic lower alcohol suspension of sulfur with a filter to obtain a sulfur cake, and the filter 20 is a rotary filter 22 or a leaf filter.

3 Claims, 2 Drawing Sheets

(51) Int. Cl.
  *B01D 53/48* (2006.01)
  *B01D 53/78* (2006.01)
  *B01D 29/39* (2006.01)

(52) U.S. Cl.
  CPC ............ *B01D 53/48* (2013.01); *B01D 53/78* (2013.01); *C01B 17/168* (2013.01); *B01D 2252/2021* (2013.01)

(58) Field of Classification Search
  USPC ........................................................ 423/563
  See application file for complete search history.

(56) References Cited

U.S. PATENT DOCUMENTS

| | | | |
|---|---|---|---|
| 2008/0207871 A1 | 8/2008 | Seiler et al. | |
| 2009/0242379 A1 | 10/2009 | Tokumasu et al. | |

FOREIGN PATENT DOCUMENTS

| | | |
|---|---|---|
| JP | 2005-171270 A | 6/2005 |
| JP | 2006-45599 A | 2/2006 |
| JP | 2009-512769 A | 3/2009 |
| JP | 2009-234806 A | 10/2009 |
| JP | 2010-30866 A | 2/2010 |

OTHER PUBLICATIONS

International Preliminary Report on Patentability and Written Opinion dated Jun. 30, 2020 in PCT/JP2018/047144 (submitting English translation only), citing documents AO-AR therein, 5 pages.
Singaporean Office Action dated Apr. 1, 2021 in Singaporean Patent Application No. 11202005622U, 6 pages.
Extended European Search Report dated Jun. 21, 2021 in European Patent Application No. 18893554.8, citing documentd AA and AO therein, 7 pages.
Japanese Office Action dated Mar. 1, 2022 in corresponding Japanese Application No. 2019-561625. (With English translation).
European communication dated Apr. 19, 2022 in corresponding European Application No. 18893554.8.

\* cited by examiner

HYDROGEN SULFIDE PRODUCTION METHOD AND SULFUR RECOVERY METHOD

TECHNICAL FIELD

This patent application claims priority under the Paris Convention based on Japanese Patent Application No. 2017-247733 (filed on Dec. 25, 2017) incorporated herein by reference in its entirety.

The present invention relates to a hydrogen sulfide production method and a sulfur recovery method.

BACKGROUND ART

Hydrogen sulfide is used for production of organic sulfur compounds such as methyl mercaptan and thioglycolic acid. Hydrogen sulfide is produced by reacting sulfur and hydrogen in a liquid phase or a gas phase.

A crude hydrogen sulfide gas obtained by this reaction may contain impurities such as sulfur, which is a raw material, in addition to hydrogen sulfide. Therefore, to remove impurities from the crude hydrogen sulfide gas and use hydrogen sulfide for the production described above, studies have been conducted on a method for purifying a crude hydrogen sulfide gas (e.g., Patent Document 1).

In a hydrogen sulfide gas purification method disclosed in Patent Document 1, a crude hydrogen sulfide gas is brought into contact with alcohol in a packed tower. After sulfur is made into a powder form and taken into alcohol through this contact, this powdery sulfur is caused to adhere to a packed part of the packed tower, and sulfur is thereby removed from the crude hydrogen sulfide gas.

Sulfur is a raw material for hydrogen sulfide. Therefore, from the viewpoint of reusing sulfur, the sulfur caused to adhere to the packed part of the packed tower is recovered in the purification method disclosed in Patent Document 1.

PRIOR ART DOCUMENT

Patent Document

Patent Document 1: Japanese Laid-Open Patent Publication No. 2010-030866

SUMMARY OF THE INVENTION

Problem to be Solved by the Invention

As described above, in the purification method disclosed in Patent Document 1, sulfur adhering to the packed part is recovered. However, a portion of the sulfur remains in the alcohol without adhering to the packed part, so that not all the sulfur contained in the crude hydrogen sulfide gas can be recovered in reality.

If the alcohol containing remaining sulfur is continuously used, the sulfur may block a piping.

If the alcohol containing sulfur is treated as a waste liquid, the recovery rate of sulfur cannot be improved, and additionally, disposal of sulfur may adversely affect the environment.

The sulfur remaining in the alcohol contains sulfur having a small particle diameter, and the sulfur having a small particle diameter tends to float in a liquid without settling. Therefore, it is difficult to recover all the sulfur remaining in the alcohol by a solid-liquid separation method such as sedimentation or centrifugation.

In Patent Document 1, a technique for recovering sulfur adhering to the packed part is described in detail; however, the sulfur remaining in the alcohol is not even mentioned. Therefore, in Patent Document 1, a technique for recovering sulfur remaining in alcohol is not disclosed. A method for producing hydrogen sulfide from sulfur and hydrogen can potentially further be improved in sulfur recovery rate.

The present invention has been conceived in view of the situations, and an object thereof is to provide a hydrogen sulfide production method and a sulfur recovery method enabling efficient recovery of sulfur.

Means for Solving Problem

As a result of intensive studies on a method for recovering sulfur from a suspension of sulfur in alcohol obtained by purifying a crude hydrogen sulfide gas containing sulfur in a method for producing hydrogen sulfide from sulfur and hydrogen, the present inventor has found that sulfur can efficiently be recovered by filtering the suspension of sulfur in alcohol with a particular filter, thereby completing the present invention.

Therefore, the present invention provides a method for producing hydrogen sulfide from sulfur and hydrogen comprising (1) a reaction step of reacting sulfur and hydrogen to obtain a crude hydrogen sulfide gas, (2) a purification step of purifying the crude hydrogen sulfide gas by bringing the crude hydrogen sulfide gas into contact with aliphatic lower alcohol in a packed tower to precipitate sulfur contained in the crude hydrogen sulfide gas, (3) a discharge step of discharging from inside the packed tower a suspension of sulfur in lower aliphatic alcohol obtained in the purification step, and (4) a filtration step of filtering the suspension of sulfur in aliphatic lower alcohol with a filter to obtain a sulfur cake, wherein the filter is a rotary filter or a leaf filter.

In this hydrogen sulfide production method, the sulfur cake is obtained by filtering the suspension of sulfur in aliphatic lower alcohol obtained by purifying the crude hydrogen sulfide gas with aliphatic lower alcohol. This sulfur cake is subjected to a treatment such as heating and drying to obtain the sulfur reusable as a raw material. Particularly, since the rotary filter or the leaf filter is used as the filter for filtering the suspension of sulfur in aliphatic lower alcohol, sulfur having a small particle diameter difficult to recover by a solid-liquid separation method such as sedimentation or centrifugation can be recovered. Moreover, sulfur is not contained in a filtrate discharged from the filter. This production method enables efficient recovery of sulfur and can reduce an environmental load. From the viewpoint of efficient recovery of sulfur, the filter is preferably the rotary filter.

In another viewpoint, the present invention provides a method for recovering sulfur from a crude hydrogen sulfide gas containing sulfur comprising (1) a purification step of purifying the crude hydrogen sulfide gas by bringing the crude hydrogen sulfide gas into contact with aliphatic lower alcohol in a packed tower to precipitate sulfur contained in the crude hydrogen sulfide gas, (2) a discharge step of discharging from inside the packed tower a suspension of sulfur in aliphatic lower alcohol obtained in the purification step, and (3) a filtration step of filtering the suspension of sulfur in aliphatic lower alcohol with a filter to obtain a sulfur cake, wherein the filter is a rotary filter or a leaf filter.

In this sulfur recovery method, as with the hydrogen sulfide production method described above, the sulfur cake is obtained by filtering the suspension of sulfur in aliphatic lower alcohol obtained by bringing the crude hydrogen sulfide gas into contact with aliphatic lower alcohol. This sulfur cake is subjected to treatments such as heating and drying to obtain the sulfur reusable as a raw material. Particularly, because the rotary filter or the leaf filter is used as the filter for filtering the suspension of sulfur in aliphatic lower alcohol, sulfur having a small particle diameter difficult to recover by a solid-liquid separation method such as sedimentation or centrifugation can be recovered. Moreover, sulfur is not contained in a filtrate discharged from the filter. This recovery method enables efficient recovery of sulfur and can reduce an environmental load.

From the viewpoint of efficient recovery of sulfur, the filter is preferably the rotary filter.

Effect of the Invention

As is clear from the above description, the hydrogen sulfide production method and the sulfur recovery method of the present invention enables efficient recovery of sulfur and can reduce an environmental load.

MODES FOR CARRYING OUT THE INVENTION

The present invention will now be described in detail based on preferred embodiments with appropriate reference to the drawings.

A hydrogen sulfide production method of the present invention comprises a reaction step, a purification step, a discharge step, a filtration step, and a drying step. Details of the steps will hereinafter be described.

[Reaction Step]

In the reaction step, hydrogen sulfide is generated by reacting sulfur and hydrogen. In this production method, excess sulfur is used for producing hydrogen sulfide. Therefore, a gas obtained by reacting sulfur and hydrogen contains excess sulfur in addition to hydrogen sulfide. In the present invention, a gas obtained by reacting sulfur and hydrogen and containing sulfur in addition to hydrogen sulfide is referred to as a crude hydrogen sulfide gas. In this reaction step, excess sulfur and hydrogen are reacted to obtain the crude hydrogen sulfide gas containing unreacted sulfur.

In this production method, the crude hydrogen sulfide gas is obtained by supplying gaseous sulfur and a hydrogen gas into a reactor (not shown) filled with a catalyst and reacting the sulfur and the hydrogen gas; however, a method for generating the crude hydrogen sulfide gas is not particularly limited in the present invention. In this production method, from the viewpoint of efficiently generating hydrogen sulfide, the molar ratio of sulfur atoms to hydrogen molecules in the raw material gas supplied to the reactor is adjusted to preferably 1 to 1.5, more preferably 1 to 1.3.

[Purification Step]

Figure 1:
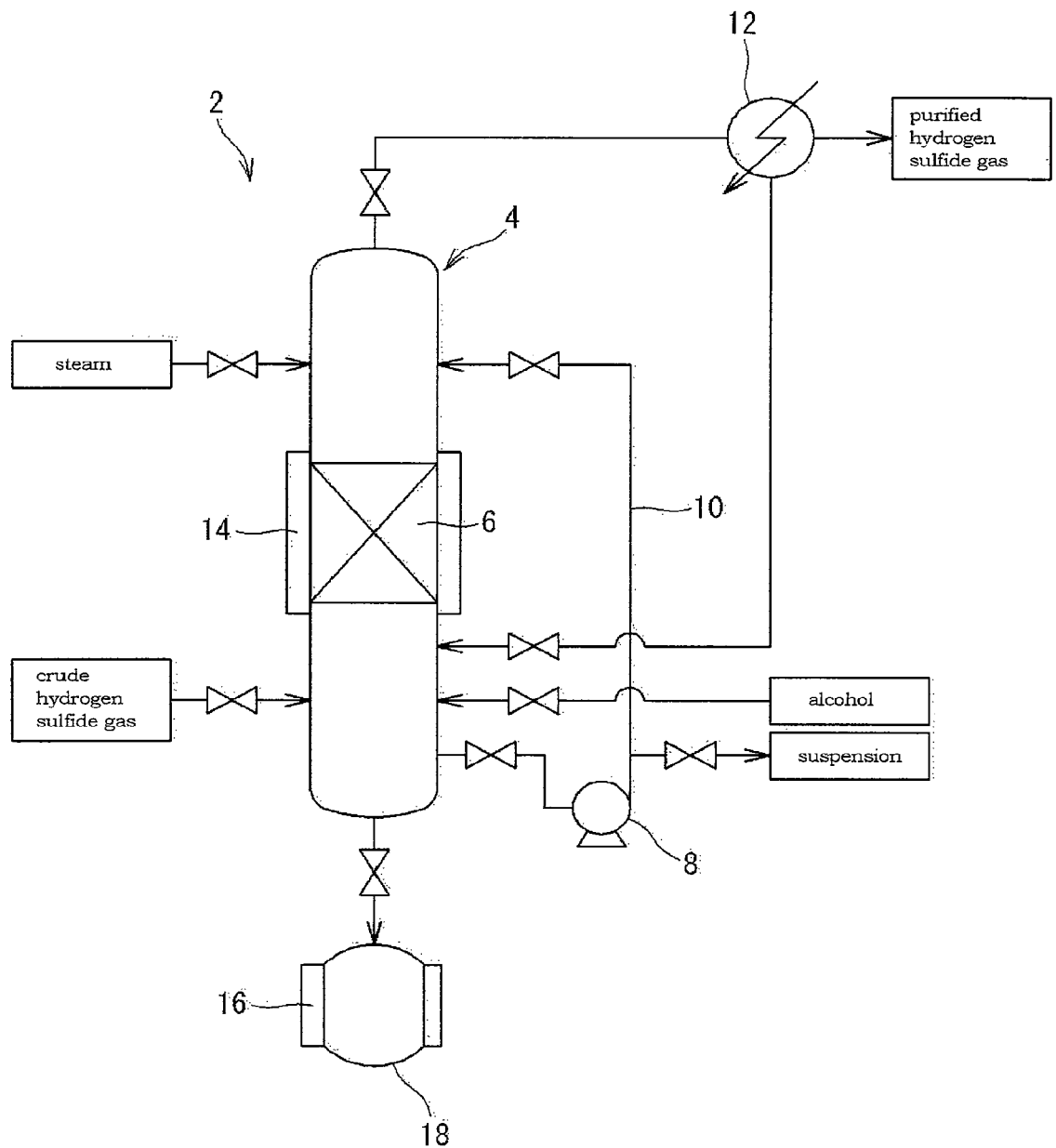
FIG. 1 is a schematic showing a packed tower used in a hydrogen sulfide production method according to an embodiment of the present invention.

In the purification step, the crude hydrogen sulfide gas obtained in the reaction step is purified. In this production method, a facility 2 shown in FIG. 1 is used for purification of the crude hydrogen sulfide gas.

The facility 2 comprises a packed tower 4. The packed tower 4 comprises a packed part 6. Although not shown, the packed part 6 is packed with Raschig rings.

In this purification step, the crude hydrogen sulfide gas described above is supplied to the packed tower 4. The crude hydrogen sulfide gas is introduced into the packed tower 4 from a lower portion of the packed tower 4. Aliphatic lower alcohol is also supplied to the packed tower 4. The aliphatic lower alcohol is introduced into the packed tower 4 from the lower portion of the packed tower 4 and is then repeatedly circulated in the packed tower 4 via a circulation line 10 by a pump 8.

As described above, in this production method, the aliphatic lower alcohol is supplied to the packed tower 4.

In the present invention, the aliphatic lower alcohol refers to aliphatic alcohol having the carbon number of 5 or less. Examples of the aliphatic lower alcohol include methanol, ethanol, and propanol. From the viewpoint of ease of handling, the aliphatic lower alcohol is preferably methanol. Particularly, methanol is used for the production of methyl mercaptan. Therefore, when hydrogen sulfide is used as a raw material for methyl mercaptan, the aliphatic lower alcohol is preferably methanol.

In this production method, the aliphatic lower alcohol (hereinafter also referred to as alcohol) can be mixed with water before use if necessary. In this case, examples of water used for mixing with the alcohol include pure water, ion-exchanged water, tap water, and industrial water. When methanol is used as the alcohol, the proportion of the amount of methanol to the total amount of liquid mixture of methanol and water is set at 30 mass % or more.

In this purification step, the crude hydrogen sulfide gas is brought into contact with alcohol in the packed tower 4. This contact causes the sulfur contained in the crude hydrogen sulfide gas to precipitate as crystals. In this purification step, the contact between the crude hydrogen sulfide gas and alcohol is performed within a range from normal temperature to 40° C.

This purification step allows the crystallized sulfur to be taken into the alcohol and provides a suspension in which the crystallized sulfur is suspended in the alcohol, i.e., the suspension of sulfur in alcohol. As the result, sulfur is removed from the crude hydrogen sulfide gas.

In this production method, the crude hydrogen sulfide gas may contain hydrogen polysulfide in addition to hydrogen sulfide and sulfur. When coming into contact with alcohol, hydrogen polysulfide decomposes into hydrogen sulfide and sulfur. Therefore, when the crude hydrogen sulfide gas contains hydrogen polysulfide, the suspension of sulfur in alcohol obtained in the purification step contains sulfur derived from the hydrogen polysulfide gas.

In this purification step, the crude hydrogen sulfide gas with sulfur removed (hereinafter also referred to as a semi-purified hydrogen sulfide gas) is discharged from an upper portion of the packed tower 4. As described above, the crude hydrogen sulfide gas is brought into contact with alcohol. Therefore, the semi-purified hydrogen sulfide gas contains alcohol at a vapor pressure.

In this production method, the semi-purified hydrogen sulfide gas is cooled in a condenser 12 adjusted to a temperature within a range of −5° C. to 5° C., and the alcohol contained at a vapor pressure in the semi-purified hydrogen sulfide gas is condensed. As a result, the alcohol is removed from the semi-purified hydrogen sulfide gas, and hydrogen sulfide is discharged from the condenser 12 as a purified hydrogen sulfide gas.

In this purification step, the crude hydrogen sulfide gas is purified by bringing the crude hydrogen sulfide gas into contact with the alcohol in the packed tower 4 to precipitate the sulfur contained in the crude hydrogen sulfide gas as described above.

As described above, in the purification step, the suspension of sulfur in aliphatic lower alcohol (hereinafter also referred to as a suspension) is obtained. In this purification step, the suspension passes through the packed part 6. This passage causes the crystallized sulfur contained in the suspension to adhere to the packed part 6. In this facility 2, the suspension is repeatedly circulated in the packed tower 4 via the circulation line 10, so that the sulfur accumulates in the packed part 6. Therefore, in this facility 2, the sulfur adhering to the packed part 6 is recovered as appropriate in consideration of operation conditions of the packed tower 4 etc. In this production method, the suspension repeatedly circulated in the packed tower 4 is discharged from inside the packed tower 4 so as to recover the sulfur adhering to the packed part 6.

[Discharge Step]

In the discharge step, the supply of the crude hydrogen sulfide gas and the alcohol as well as the circulation of the alcohol and/or the suspension are stopped. After the stop, the suspension is discharged from inside the packed tower 4. In this production method, after the suspension is discharged, water is put into the packed tower 4 to wash the inside of the packed tower 4. After washing, the water used for this washing (hereinafter also referred to as washing water) is discharged from inside the packed tower 4. A portion or whole of the discharged washing water is mixed with the suspension.

In this production method, the suspension discharged from the packed tower 4 contains sulfur that could not adhere to the packed part 6. The content percentage of sulfur contained in the suspension discharged from inside the packed tower 4 is usually in a range of 0.1 mass % to 7.5 mass %. In the present invention, the content percentage of sulfur is obtained by a loss-on-heat method.

In this production method, after the suspension is discharged from inside the packed tower 4, steam is supplied to a jacket 14 disposed outside the packed part 6 to heat the packed part 6. Additionally, steam is supplied inside the packed tower 4 to melt the sulfur adhering to the inside of the packed tower 4. The melted sulfur is allowed to flow down and recovered in a tank 18 heated by supplying steam to a jacket 16. In this production method, the sulfur adhering to the packed tower 4 is recovered in this way. In this production method, the steam supplied to the jacket 14 of the packed part 6, the steam supplied to the inside of the packed tower 4, and the steam supplied to the jacket 16 of the tank 18 preferably have a temperature set in a range of 130° C. to 160° C.

As described above, in this production method, the timing of recovery of sulfur is appropriately determined in consideration of the operation conditions etc. of the packed tower 4. Specifically, a pressure difference between a bottom and a top of the packed tower 4 is monitored, and the timing of recovery of sulfur is determined in consideration of a degree of blockage.

As described above, in the discharge step, the suspension obtained in the purification step is discharged from inside the packed tower 4. In this production method, this suspension is filtered by using a filter.

[Filtration Step]

Figure 2:
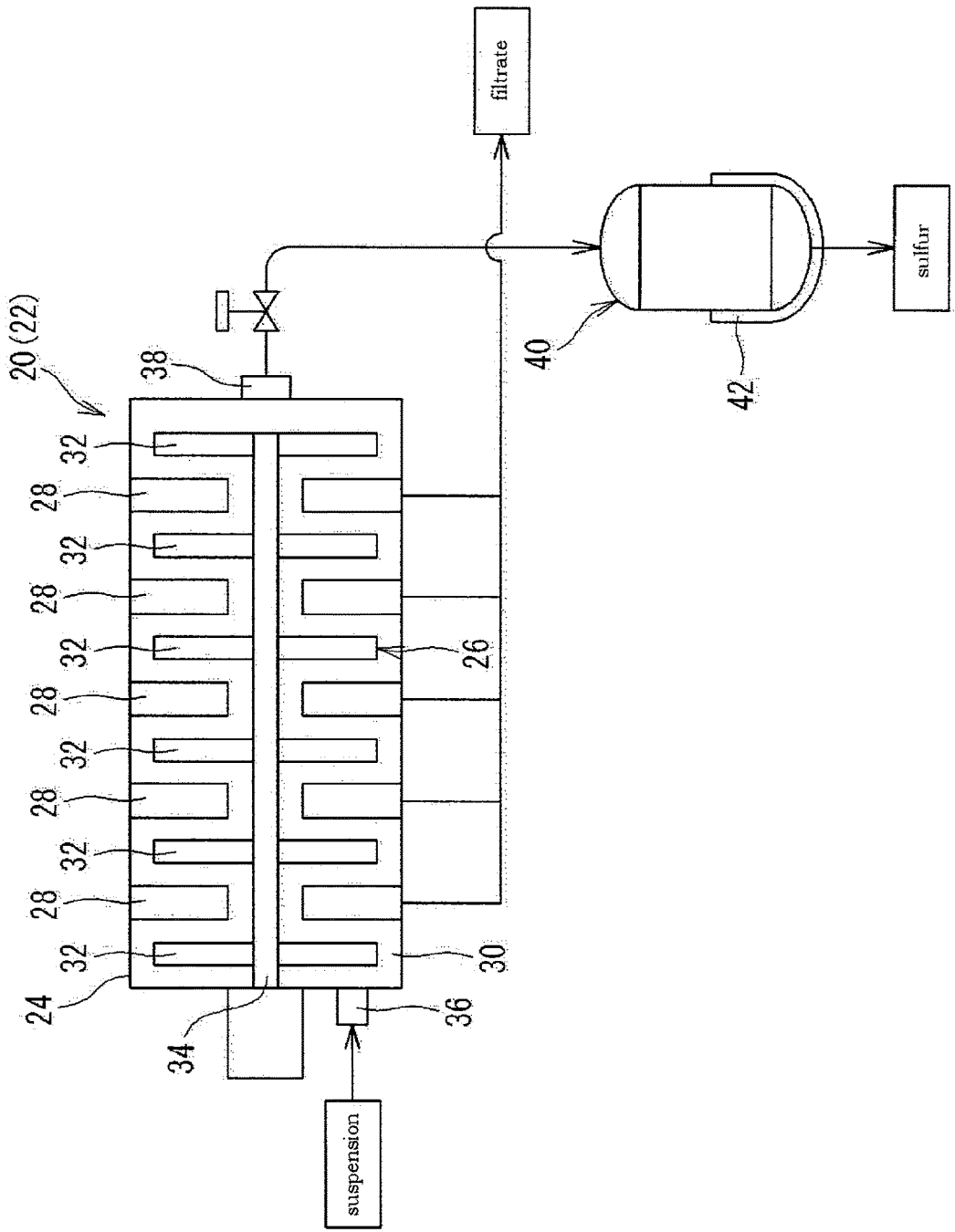
FIG. 2 is a schematic showing a filter for filtering a suspension of sulfur in aliphatic lower alcohol recovered from inside the packed tower of FIG. 1.

In the filtration step, a filter 20 shown in FIG. 2 is used for filtering the suspension recovered from inside the packed tower 4. The filter 20 will hereinafter be described.

In this production method, a rotary filter 22 is used as the filter 20. The rotary filter 22 comprises a cylindrical drum 24, a stirring part 26, and multiple (in this illustration, five) filtration plates 28. This rotary filter 22 has a space referred to as a filtration chamber 30 between the stirring part 26 and the filtration plate 28 inside the drum 24.

The rotary filter 22 has the stirring part 26 disposed inside the drum 24. The stirring part 26 comprises multiple (in this illustration, six) stirring plates 32 and a drive shaft 34. The multiple stirring plates 32 are fixed to the drive shaft 34. These stirring plates 32 are arranged at intervals along the drive shaft 34. The rotary filter 22 is configured such that the drive shaft 34 is rotated by a motor (not shown) to rotate the stirring plates 32.

The rotary filter 22 has the multiple filtration plates 28 each projected inward from an inner surface of the drum 24. The filtration plates 28 are each arranged at a position between two of the stirring plates 32. Although not shown, the filtration plates 28 have a structure in which filter media are attached via a filter media reinforcing plate such as metal mesh to both sides of a support plate fixed to the inner surface of the drum 24.

In this production method, the suspension at normal temperature is pressurized and supplied from a supply port 36. This suspension threads through the filtration plates 28 to move inside the filtration chamber 30 toward a discharge port 38 while being stirred by the stirring plates 32. During this movement, the suspension is filtered through each of the filtration plates 28, and a sulfur cake is discharged as a concentrate from the discharge port 38. A filtrate obtained by filtering the suspension is discharged through the support plates of the filtration plates 28. Since the filter media are made up of filter media capable of capturing sulfur having a small particle diameter contained in the suspension, sulfur is not contained in the filtrate obtained by filtering the suspension. In this production method, this filtrate is treated as wastewater.

Regarding the operation conditions of the rotary filter in this production method, for example, the rotary filter 22 having a filtration area in a range of 0.10 to 50.0 m$^2$ is used, and the supply pressure of the suspension is set in a range of 0.1 to 1.0 MPaG. The supply amount per m$^2$ of the filtration area is set in a range of 0.5 to 50.0 m$^3$ per hour. The temperature in the filtration chamber 30 is usually set in a range of 0 to 40° C. The rotation torque of the stirring part 26 is set in a range of 0.5 to 100.0 kW. The filter media are appropriately selected from those having corrosion resistance, and examples of the material thereof comprise synthetic fibers of polypropylene, polyester, etc., and metal such as stainless steel. When a synthetic fiber filter cloth is used, a filter cloth having an air permeability of about 0.03 to 1.0 cm$^3$/cm$^2$·s is preferably used. When a wire cloth is used, a wire cloth of about 40 to 400 meshes is preferably used.

In the rotary filter 22, the pressurized and supplied suspension is filtered through the filtration plates 28. The rotary filter 22 is a pressure type filter. Additionally, the rotary filter 22 continuously provides a sulfur cake when the suspension is supplied. The rotary filter 22 is a pressure type continuous filter. An example of the rotary filter 22 as described above is "Rotary Filter" (trade name) manufactured by Hiroshima Metal & Machinery Co., Ltd.

An industrially-used pressure type filter other than the rotary filter 22 is a leaf filter. In this production method, this leaf filter is also usable as the filter 20.

Although not shown, a multiplicity of leaf-shaped filtration plates and a shaft are disposed inside the leaf filter. The multiplicity of filtration plates is fixed to the shaft and arranged at intervals along the shaft. In this leaf filter, the pressurized and supplied suspension is filtered by the filtration plates, and a sulfur cake is accumulated as a concentrate on the filtration plates. The filtrate is discharged through the shaft. When the sulfur cake is accumulated to some extent, the supply of the suspension is stopped, and the shaft is rotated. As a result, the sulfur cake accumulated on the filtration plates is released from the filtration plates due to a centrifugal force, and the sulfur cake is recovered. In this leaf filter, the supply of the suspension is stopped when the sulfur cake is recovered as the concentrate. This leaf filter is a pressure type batch filter. An example of the leaf filter as described above is "Leaf Filter" (trade name) manufactured by IHI.

[Drying Step]

In this production method, the sulfur cake obtained in the filtration step is supplied to a heating drum 40. The sulfur cake is dried in this heating drum 40.

A jacket 42 is disposed outside the heating drum 40. Although not shown, a coiled tube is disposed inside the heating drum 40. Steam is supplied to each of the jacket 42 and the coiled tube. As a result, the heating drum 40 is heated. In this production method, the steam supplied to the jacket 42 and the steam supplied to the coiled tube preferably have a temperature set in a range of 130° C. to 160° C.

In this production method, the sulfur cake is heated in the heating drum 40. As a result, the sulfur cake is dried, and sulfur is obtained. This sulfur is reused as a raw material of hydrogen sulfide together with the sulfur recovered from inside the packed tower 4 described above. In this production method, the heating time for drying is set in a range of 10 hours to 100 hours.

In this production method, the sulfur cake is obtained by filtering the suspension discharged after purification of crude hydrogen sulfide. This sulfur cake is subjected to a treatment such as heating and drying to obtain the sulfur reusable as a raw material. Particularly, since the rotary filter 22 or the leaf filter is used as the filter 20 for filtering the suspension, sulfur having a small particle diameter difficult to recover by a solid-liquid separation method such as sedimentation or centrifugation can be recovered. Moreover, sulfur is not contained in the filtrate discharged from the filter 20. This production method enables efficient recovery of sulfur and can reduce an environmental load. From the viewpoint of efficient recovery of sulfur, the filter 20 is preferably the rotary filter 22, which is a pressure type continuous filter.

In this production method, if the content percentage of sulfur in the cake is too low, the amount of steam used in the drying step increases. From this viewpoint, the content percentage of sulfur in the cake is preferably 10 mass % or more, more preferably 20 mass % or more. If the content percentage of sulfur in the cake is too high, the cake may be solidified so that the cake may become difficult to discharge. From this viewpoint, the content percentage of sulfur in this cake is preferably 60 mass % or less, and more preferably 50 mass % or less.

The hydrogen sulfide production method described above comprises a method for recovering sulfur from a crude hydrogen sulfide gas containing sulfur. Therefore, in another viewpoint, the present invention provides a method for recovering sulfur from a crude hydrogen sulfide gas containing sulfur. The sulfur recovery method of the present invention comprises the purification step, the discharge step, and the filtration step described above. Although the sulfur recovery method of the present invention is suitable as a sulfur recovery method in the hydrogen sulfide production method of the present invention as described above, the range of application thereof is not limited thereto.

As is clear from the above description, according to the hydrogen sulfide production method and the sulfur recovery method of the present invention, sulfur can efficiently be recovered.

EXAMPLE

The present invention will hereinafter be described in more detail with an example etc.; however, the present invention is not limited only to the example.

[Production of Reactor]

A reactor was prepared by filling a catalyst in a fixed bed multitubular reactor made of stainless steel. A mixture of activated alumina simple substance and activated alumina having 5% molybdenum supported thereon was used as the catalyst.

[Production of Crude Hydrogen Sulfide Gas]

A hydrogen gas was applied at about 500 $Nm^3$ per hour to a liquid phase part of molten sulfur heated to 380° C. in a gasification unit to generate a mixed gas of hydrogen gas and sulfur gas. The molar ratio of sulfur atoms to hydrogen molecules in this step was 2.10.

A hydrogen gas was then added at about 500 $Nm^3$ per hour to the generated mixed gas to prepare a raw material gas such that the molar ratio of sulfur atoms to hydrogen molecules was 1.05.

Subsequently, the raw material gas was supplied to the reactor set at 380° C. under the condition of the pressure of 45 kPaG. In the reactor, sulfur and hydrogen were reacted to obtain a crude hydrogen sulfide gas (sulfur concentration=1.6 $g/m^3$).

[Purification of Crude Hydrogen Sulfide Gas]

The crude hydrogen sulfide gas obtained by reacting sulfur and hydrogen in the reactor was brought into contact with methanol in a stainless steel packed tower (1500 mmφ in diameter×7000 mm in height, packed part: 80 A Raschig rings were packed to a height of 3000 mm) having the same configuration as the packed tower shown in FIG. 1 to precipitate the sulfur contained in the crude hydrogen sulfide gas for purifying the crude hydrogen sulfide gas. The circulation flow rate of methanol was set at about 40 $m^3$ per hour. The amount of the crude hydrogen sulfide gas supplied to the packed tower was set at about 1000 $Nm^3$ per hour. The emission gas from the packed tower was cooled to about 0° C. by a multitubular condenser (heat transfer area: 46 $m^2$), and condensed methanol was recovered in the packed tower. The temperature of emission gas from the packed tower was about 25° C. The methanol was replenished to achieve a constant liquid level in the packed tower. The sulfur concentration in the obtained purified hydrogen sulfide gas was less than 0.1 $g/m^3$. The sulfur concentration was obtained from an amount of sulfur that was powder sulfur filtered and dried from the hydrogen sulfide gas introduced and collected into a collection bottle filled with water.

After the packed tower was continuously operated for about 2 weeks, the supply of the crude hydrogen sulfide gas and the methanol was stopped, and a suspension was discharged from inside the packed tower. Steam was supplied at about 140° C. into the packed tower to melt and recover the sulfur in the packed tower.

Example

The suspension discharged from inside the packed tower was filtered by using a filter having the same configuration as the filter shown in FIG. 2 (trade name "Rotary Filter: RF-02 (filtration area=0.18 m$^2$)" manufactured by Hiroshima Metal & Machinery Co., Ltd.). The operation conditions of this filter were set as described below. For the filter media, a polyester filter cloth having an air permeability of 0.07 to 0.1 cm$^3$/cm$^2$·s was used. The content percentage of sulfur in the suspension was 4.7 mass %.

Supply pressure=0.3 to 0.4 MPaG
Supply amount=1312 kg/h (1.20 m$^3$/h)
Temperature in filtration chamber=25 to 29° C.
Rotational torque of stirring part=1.0 to 1.7 kW In this example, the suspension having the sulfur content percentage of 4.7 mass % was supplied at a supply rate of 1312 kg per hour to obtain a sulfur cake at 136 kg per hour and a filtrate at 1176 kg per hour. The content percentage of sulfur in the cake was 45 mass %. The content percentage of sulfur in the filtrate was 0 mass %, i.e., sulfur was not contained in the filtrate. The sum of the amount of the sulfur recovered from the suspension by using the filter and the amount of sulfur recovered in the packed tower was 2.6 times by mass the amount of the sulfur recovered in the packed tower.

In this example, it was confirmed that sulfur having a small particle diameter difficult to recover by centrifugation can be recovered. This result clearly shows the superiority of the present invention.

INDUSTRIAL APPLICABILITY

According to the hydrogen sulfide production method and the sulfur recovery method described above, sulfur can efficiently be recovered, and the environmental load can be reduced.

EXPLANATIONS OF LETTERS OR NUMERALS 2 facility
4 packed tower
6 packed part
8 pump
10 circulation line
12 condenser
14 jacket
16 jacket
18 tank
20 filter
22 rotary filter
24 drum
26 stirring part
28 filtration plate
30 filtration chamber
32 stirring plate
34 drive shaft
36 supply port
38 discharge port
40 heating drum
42 jacket

The invention claimed is:

1. A method for producing hydrogen sulfide from sulfur and hydrogen comprising:
a reaction step of reacting sulfur and hydrogen to obtain a crude hydrogen sulfide gas;
a purification step of purifying the crude hydrogen sulfide gas by bringing the crude hydrogen sulfide gas into contact with aliphatic lower alcohol in a packed tower to precipitate sulfur contained in the crude hydrogen sulfide gas;
a discharge step of discharging from inside the packed tower a suspension of sulfur in aliphatic lower alcohol obtained in the purification step;
a filtration step of filtering the suspension of sulfur in aliphatic lower alcohol with a filter to obtain a sulfur cake and a filtrate: and
treating the filtrate as wastewater
wherein
the filter is a rotary filter or a leaf filter.

2. The method according to claim 1, wherein the filter is the rotary filter.

3. A method for recovering sulfur from a crude hydrogen sulfide gas containing sulfur comprising:
a purification step of purifying the crude hydrogen sulfide gas by bringing the crude hydrogen sulfide gas into contact with aliphatic lower alcohol in a packed tower to precipitate sulfur contained in the crude hydrogen sulfide gas;
a discharge step of discharging from inside the packed tower a suspension of sulfur in aliphatic lower alcohol obtained in the purification step;
a filtration step of filtering the suspension of sulfur in aliphatic lower alcohol with a filter to obtain a sulfur cake and a filtrate; and
treating the filtrate as wastewater;
wherein
the filter is a rotary filter or a leaf filter.

* * * * *